Dec. 16, 1947.  C. C. RUTBELL ET AL  2,432,809
GEAR CUTTING MACHINE
Filed April 4, 1945  4 Sheets-Sheet 1

INVENTORS
C. C. RUTBELL
J. LUSHT
BY
ATTORNEY

INVENTORS
C.C. RUTBELL
J. LUSHT
BY
ATTORNEY

Patented Dec. 16, 1947

2,432,809

UNITED STATES PATENT OFFICE 2,432,809

GEAR CUTTING MACHINE

Clarence C. Rutbell, Endicott, and Julius Lusht, Johnson City, N. Y., assignors to International Business Machines Corporation, New York, N. Y., a corporation of New York Application April 4, 1945, Serial No. 586,570

4 Claims. (Cl. 90—2)

The improved gear cutting machine comprising the present invention is primarily adapted for use in the cutting of close tolerance non-circular gears of the type employed in pairs wherein the two gears of the pair are complementary to each other in contour. The invention, however, is capable of other uses and the same may, if desired, be employed with or without modification in the cutting of a great variety of gear shapes, whether these be non-circular or circular, complementary or otherwise. The invention is also adaptable for use, with or without modification, in the shaping of certain types of cams.

The present invention relates in particular to machines of the type which operate by a generative method and which employ a rack type multiple tooth cutter, which is at least as long as the toothed peripheral portion of the gear to be cut and which receives a reciprocating movement while the blank carries out a whole rolling movement relative to the length of the cutter in order that an entire gear may be cut within a single cycle of machine operation. Additionally, during the cutting operation the blank is given a forward and backward component of motion toward and away from the cutter, which is independent of the rolling movement thereof, to take up lost motion and to accurately determine the depth of the cutting operations and thus, in turn, determine the ultimate shape of the finished product. This latter forward and backward component of motion is a positive one that is attained by means of a master gear associated with the blank or work holder and which effects a rolling motion relative to a stationary rack with which the same is associated. The master gear is of the exact shape of the finished product and by its presence in the machine it determines the motion of the work holder and, consequently, the finished shape of the blank after the same has traversed the reciprocating cutter.

Heretofore, considerable difficulty has been encountered with this type of machine in producing finished non-circular gears that are satisfactory and fall within narrow limits of tolerance. Much of this difficulty has arisen as a matter of inferior design of the moving work holder, both as regards its manner of support and as regards the manner in which it has been motivated to carry the blank being operated upon along the path of cutting movement of the reciprocating cutter. Various attempts have been made to produce a satisfactory machine wherein the work holder was manually pushed in the direction of its path of movement, whereupon the master gear, having traction upon the stationary rack with which it cooperates, would be caused to effect a rolling motion by virtue of such traction on the rack. Such attempts have invariably proven unsatisfactory due to the difficulty of manually imparting to the work holder a steady and uniform degree of pressure tending to set the same into and maintain the same in uniform motion. By virtue of the various forces encountered tending to offset this motivating pressure, not only has the tendency of the work holder been to resist forward motion at one particular time and to yield to such forward motion at another time, thus producing irregular acceleration and deceleration, but there has also been the tendency for the work holder to chatter during its movement through its operative stroke and thus produce finished gears possessing defects beyond the narrow limits of tolerance set for them.

Another difficulty encountered with machines of this type has been the inability to provide the work holder with a suitable stable support so that the same in traversing its operative stroke will remain accurately at a constant elevation and so that the rolling gear blank will at all times occupy exactly the same plane. Where such inadequate supporting means for the work holder have been utilized, chattering of the holder during which the latter vibrates with a vertical component of motion has been encountered. Such chattering obviously has resulted in the production of imperfect gears.

A still further obstacle that has been encountered by this method of producing non-circular gears has been a lack of an effective method of maintaining the work holder in position relative to the cutter while the same enters upon its backward and forward components of motion to take up play between the master gear and stationary rack. Tension spring means for accomplishing this purpose have been found to be inadequate, inasmuch as when the cutter is operating upon an area of low eccentricity at the gear blank periphery, the work holder is considerably closer to the cutting plane than it is when the cutter is operating upon an area of high eccentricity. As a consequence, such tension spring means for taking up lost motion varies to a certain extent, or at least to an extent sufficient to affect the uniformity of the finished product. In addition to this, such tension spring means frequently produces a chattering action probably arising from the tendency of the master gear to rebound from the stationary rack.

While it has been possible by the above methods occasionally to produce gears that are satisfactory and fall within narrow tolerances, such production of gears has been the exception rather than the rule, and this may be understood when it is appreciated that the tolerances required for certain precision instruments, especially those employed for war-time use, are frequently as close as .002 of an inch or less.

The present invention is designed to overcome the above noted limitations that have been attendant upon previous efforts to produce non-circular gears, and machines constructed in accordance with the principles of the present invention have been in operation a long period of time and have produced as many as 125,000 gears, even when in operation under the control of unskilled operators, without encountering a single defective gear.

In carrying out the principles of the present invention, the gear shaping apparatus, briefly, contemplates the provision of a work holder which derives an extremely positive movement by virtue of a positive rotary driving connection which is applied to the master gear and which, by virtue of the latter's tractional engagement with the stationary rack, serves to impel the work holder positively and uniformly in its path of movement during its operative stroke. The work holder is mounted for both longitudinal and transverse components of movement at the outer end of a moving support or beam, the inner end of which is pivotally connected to the outer end of a second swinging support, the various connections involved being in the form of anti-friction bearings which permit free and easy motion of the work holder. Much of the weight of the work holder per se, as well as the weight of the various supporting parts therefor, is slidably carried on a hardened steel support which receives the direct thrust of the work holder as occasioned by the cutting stroke of the cutter when traversing the gear blank, thus preventing chattering and contributing toward the production of perfect finished gears. The movable work holder, which also carries the master gear, is held in position with the master gear bearing against the stationary rack and lost motion or slack is taken up by the provision of a relatively heavy counterweight which exerts a uniform tension on the support for the work holder and thus prevents the cutter from biting into the blank undergoing shaping unevenly so that the proper depth of cut will at all times be made.

The provision of an apparatus possessing the features of novelty outlined above being the principal object of the invention, a still further object thereof is to provide a gear cutting machine of this type which is extremely rugged and durable and which, consequently, is unlikely to get out of order.

A still further object of the invention is to provide an apparatus of this character having a work holder which is firmly maintained in its various operative positions against dislodgment in order that the gear blank, when engaged by the cutter during its operative stroke, will not yield and will present its peripheral regions to the cutter for the full desired depth of cut.

Yet another object of the invention is, in a gear shaping machine, to provide a movable work holder which is capable of both lateral and longitudinal components of motion and which is comprised of a minimum number of moving parts and which, consequently, is inexpensive to manufacture.

A still further object of the present invention is to provide a work holder which will accommodate a plurality of identical gear blanks in such a manner that more than one gear may be machined during each cycle of machine operation.

Still another object of the invention is to provide a work holder for machines of this type and which relies for its movement during machine operations upon tractional engagement between the rotary master gear and a stationary rack, with the master gear being positively driven by a manual operation in which the motion of a rotary hand crank is transmitted to the master gear by an appreciable reduction in gearing, such an arrangement being conducive toward a positive and uniform drive for the work holder.

Other objects of the invention will be pointed out in the following description and claims and illustrated in the accompanying four sheets of drawings, which disclose, by way of example, the principle of the invention and the best mode, which has been contemplated, of applying that principle.

In the drawings.

In all of the above described views like characters of reference are employed to designate like parts throughout.

Figure 1:
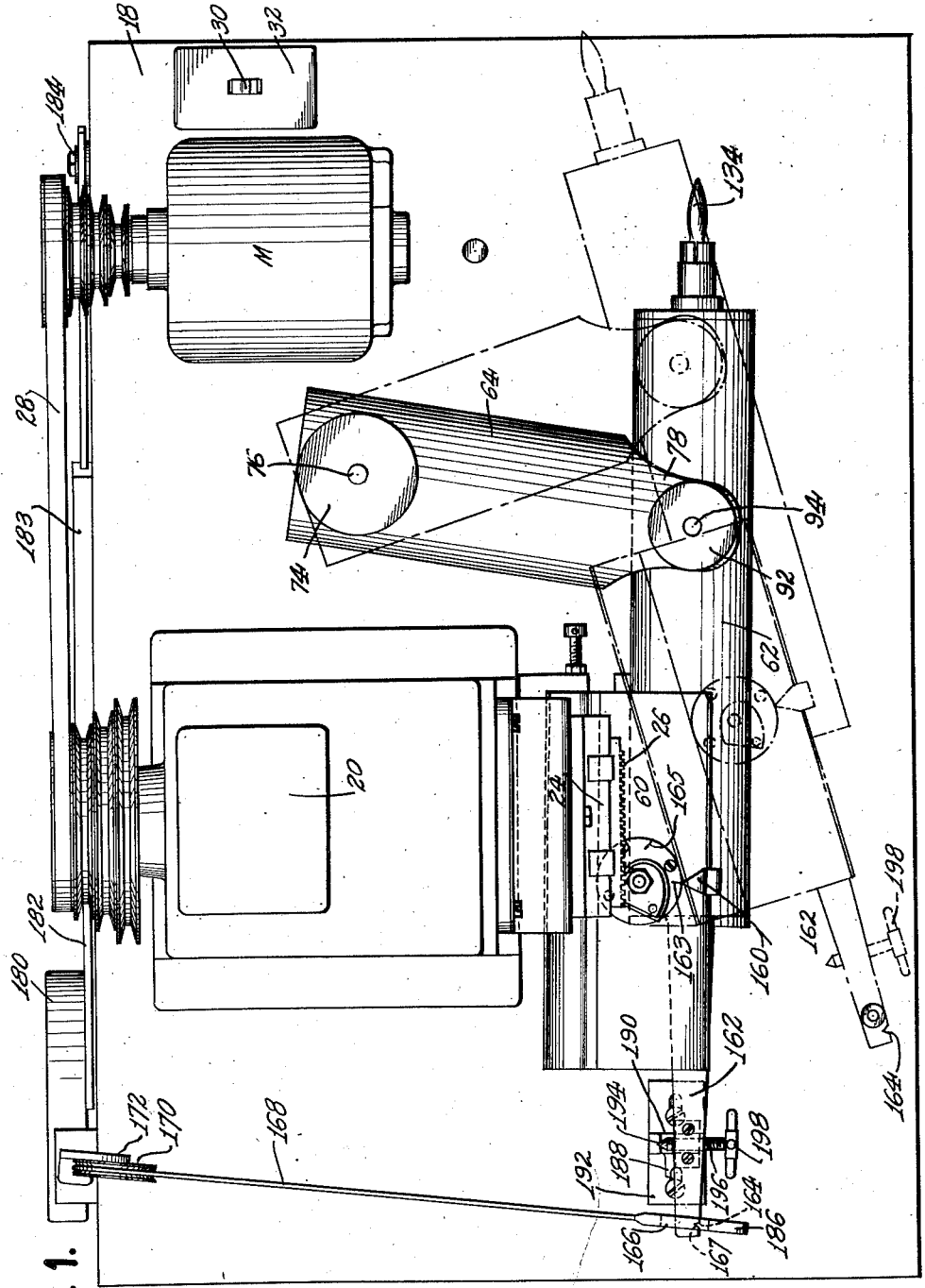
Fig. 1 is a top plan view of a gear cutting machine constructed in accordance with the principles of the present invention.

Referring now to the drawings in detail, the gear shaping machine per se is carried upon a table-like structure 10 including supporting legs 12 and a table top 14, upon which latter element there is disposed a relatively heavy casting 16 which constitutes a base for the machine proper. The casting 16 includes a solid steel surface or bed plate 18.

Suitably supported upon the surface or bed plate 18 is a conventional type of shaper assembly 20 which, if desired, may be a conventional Fellows gear shaping head and which includes a reciprocable ram 22 including a tool holder 24 which carries a rack type or multiple tooth cutting tool 26. The ram 22 is adapted to be driven through the internal mechanism (not shown) of the shaper 20, the motivating source of power being in the form of an electric motor M which is mounted on the bed plate 18 and which is connected through a conventional gear reduction belt and pulley drive assembly 28 to the internal mechanism of the shaper 20. A switch 30 mounted upon a switch box 32 supported on the bed plate 18 controls the electrical circuit for the motor M.

The arrangement of parts thus far described is purely conventional in design and no claim is made herein to any novelty associated therewith, the novelty of this invention residing rather in the construction, combination and arrangement of parts which will be set forth in detail in the following paragraphs. It is deemed sufficient for the purposes of disclosure herein to state that the internal mechanism of the shaper 20 is such that it will impart motion to the ram 22 in such a manner that the cutting tool 26 will be reciprocated in a generally triangular closed path of motion, including a downward vertical stroke wherein the cutting teeth of the tool 26 engage the gear blank material, a lateral stroke wherein the ram and cutting tool are withdrawn rearwardly horizontally away from the work, and an upwardly and forwardly inclined return stroke.

Figure 3:
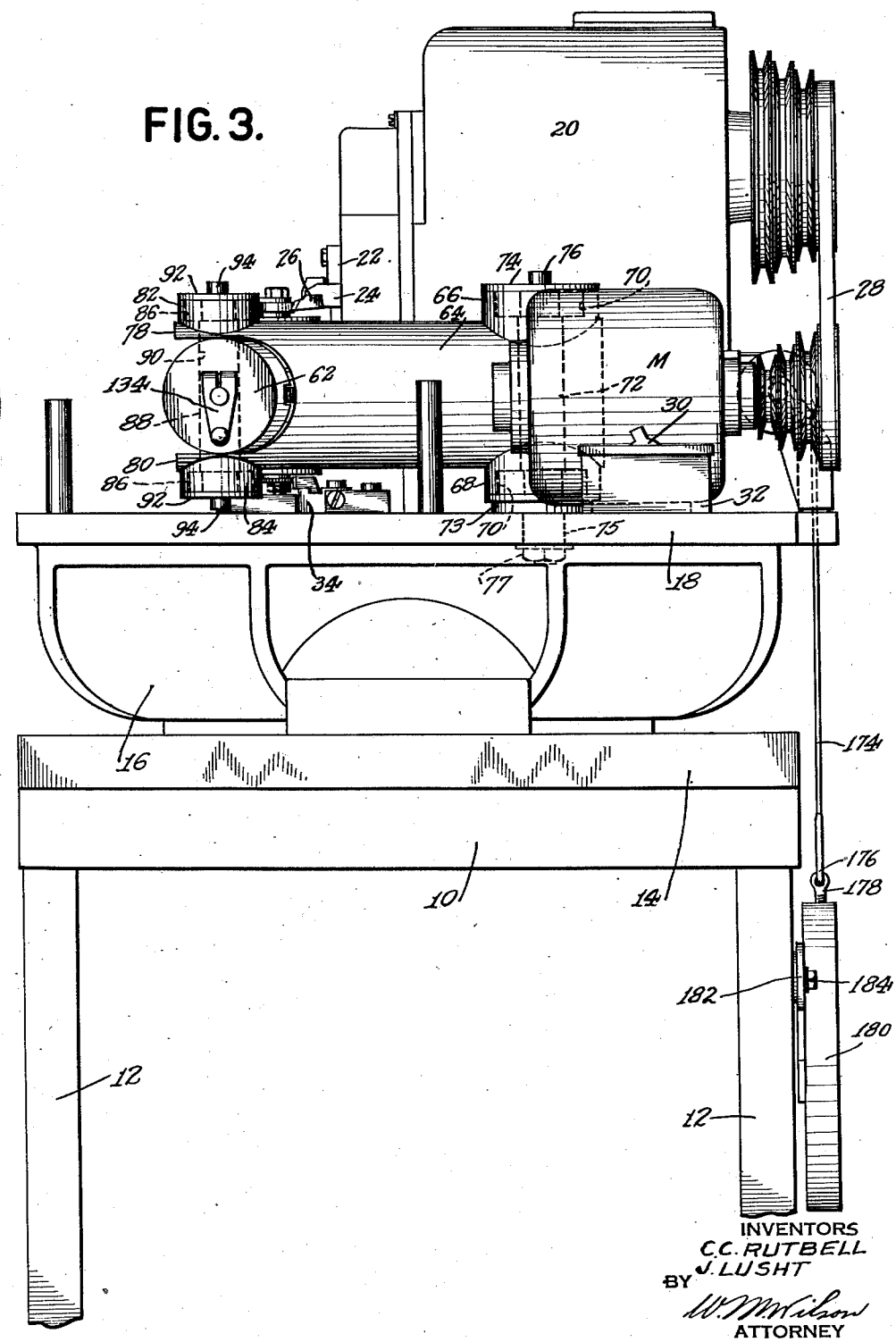
Fig. 3 is an end elevational view of the machine.

According to the present invention, a master rack support or holder 34 (see Figs. 3, 4 and 5) in the form of an adjustable block is clamped in any desired position of adjustment on the bed plate 18 by means of clamping bolts 36 that extend through laterally extending slots (not shown) formed in the support 34, and which bolts are threadedly received in the bed plate 18. The adjustment of the position of the support or holder 34 is facilitated by means of an adjusting screw 38 which extends through an ear 40 formed on a stationary block 42 which is anchored as at 44 by means of clamping bolts to the bed plate 18.

The support or holder 34 is recessed as at 46 to receive therein a longitudinal rib or flange 48 formed on a master rack 50. The master rack 50 has a toothed portion which overlies one edge of the holder 34 and which is provided with a series of aligned teeth 54 which correspond in number to the number of the teeth which are formed on the gear cutting tool 26. The teeth 54 are directly in vertical alignment with the corresponding teeth on the cutting tool 26 as is conventional in shapers of this type. The overlying toothed portion of the master rack 50 is clamped to the support or holder 34 by means of suitable clamping bolts 56 which are threadedly received in the holder 34.

The master rack 50 is designed for cooperation with a master gear 58 which is releasably supported at the lower end of a follower assembly, which is designated in its entirety at 60, and which is carried near the outer or free swinging end of a hollow tubular cylindrical operating arm 62 or carriage, the other end of which is pivoted to one end of a swinging yoke 64, which in turn is pivoted at its other end to the bed plate 18, all in a manner and for a purpose subsequently to be described.

The yoke 64 is preferably in the form of a relatively heavy hollow tubular casting, and is provided with upper and lower hub portions 66 and 68 respectively adjacent its rear end, these tubular portions extending vertically and being formed on the casting in alignment. The hubs 66 and 68 each serve to retain therein anti-friction bearing units 70 associated with a central supporting shaft 72 and which are pressed thereon. The supporting shaft 72 extends upwardly from a flanged plate 73 which rests firmly on the bed plate 18 and which is held thereon by means of an integrally formed threaded stud 75 which projects completely through the bed plate 18 and which receives thereon a nut 77.

A cover plate 74, which is held in position by means of a clamping bolt 76, serves to close the upper open end of the hub 66 and protect the bearing units 70 immediately therebelow. By the above described arrangement of parts, it will be seen that the yoke 64 is given a very rugged swinging support upon the bed plate 18 and is maintained above the bed plate in parallelism therewith a slight distance.

The yoke 64 is bifurcated at its free or outer end to provide upper and lower yoke arms 78 and 80 respectively, which straddle the operating arm 62 near the inner or right-hand end thereof, as viewed in Fig. 1. The yoke arms 78 and 80 are provided with upper and lower hubs 82 and 84 respectively, which serve to enclose therein upper and lower bearings 86 that are pressed upon the opposite ends of a central vertically extending pivot shaft 88. The pivot shaft 88 projects vertically through the operating arm 62, which is of hollow cylindrical design, and has a pressed fit in a pair of vertically aligned apertures 90 formed therein. The open ends of the hubs 82 and 84 receive thereover a pair of cover plates 92 which are held in position by means of clamping screws 94 which are threadedly received in the ends of the pivot shaft 88.

From the above description it will be seen that the hollow cylindrical operating arm 62 is rigidly supported for swinging movement relative to the yoke 64 and is, in addition to its component of swinging motion about the axis of the pivot shaft 88, also possessed of a component of shifting motion bodily wherein it may oscillate about the pivotal axis of the shaft 72. The follower assembly 60 which is carried adjacent the free or outer end of the operating arm 62 is, therefore, capable of shifting movement bodily in all directions in the same horizontal plane.

Figure 4:
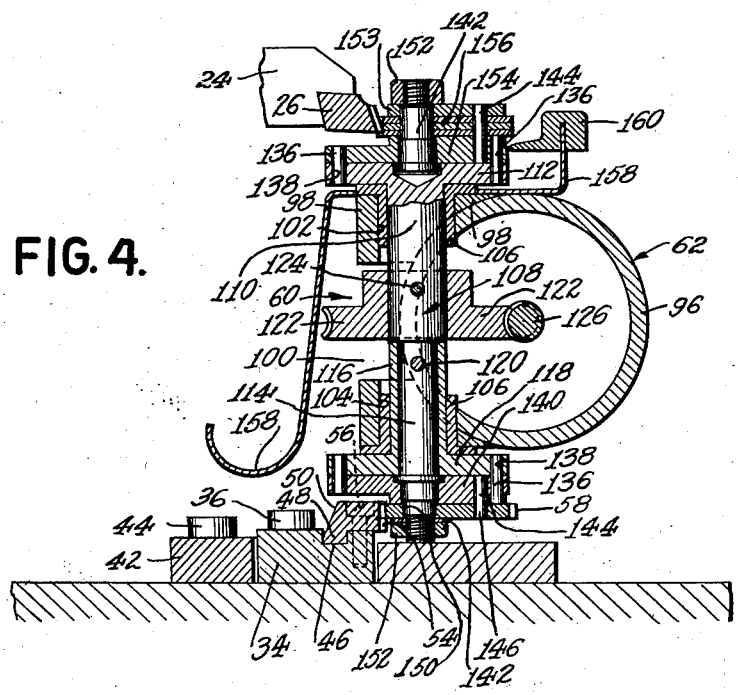
Fig. 4 is an enlarged sectional view taken substantially along the line 4—4 of Fig. 2.
Figure 5:
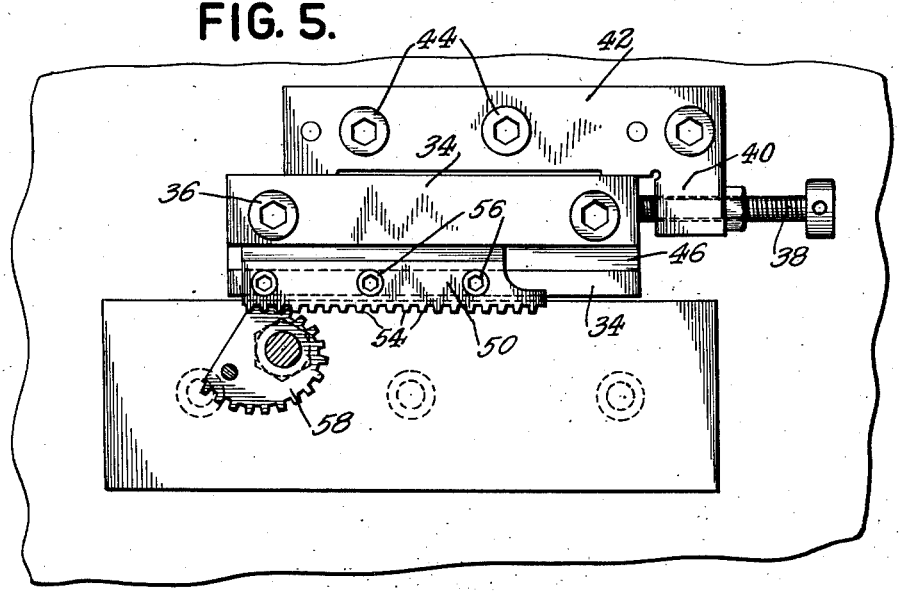
Fig. 5 is a sectional view taken substantially along the line 5—5 of Fig. 2.

Referring now to Fig. 4, the hollow cylindrical casing of the operating arm or carriage 62 is designated in its entirety at 96 and the follower assembly 60 is operatively mounted near the free end of this latter arm. Toward this end, the outer end of the cylindrical casing 96 is formed with a block portion 98 through which there extends laterally a slot or opening 100. The block portion 98 has formed therein upper and lower vertically extending bores 102 and 104 respectively, in which there are fitted upper and lower bearing sleeves 106 and in which there is rotatably disposed a two-piece separable shaft or work spindle, designated in its entirety at 108, and comprising an upper member 110 having a circular flange 112 formed at its upper end and being provided with a reduced portion 114 in its lower regions. The other section of the shaft assembly 108 is in the form of a cylindrical sleeve 116, which is provided with a lower circular flange 118 and which is telescopically received over the reduced portion 114 of the shaft 108 and is anchored thereto by means of a taper pin 120.

The shaft or work spindle 108 carries medially thereof a worm wheel 122 which is secured thereto by means of a taper pin 124. The worm wheel 122 meshes with an elongated worm shaft 126, which is supported by means of antifriction bearing units 128 and 130 and which is coextensive with and extends completely through the casing 96 centrally thereof. The worm shaft 126 extends through an opening 132 formed medially of the pivot shaft 88 and is freely rotatable therein. An operating handle 134 is provided on the end of the worm shaft 126 adjacent the pivoted end of the arm 62.

Referring again to Fig. 4, the cylindrical flange 118 is provided at its periphery with a pair of diametrically opposed upstanding locating pins 136 which are permanently associated with this flange by virtue of their having been installed thereon within a pair of recesses 138 by means of a forced fit. The locating pins 136 are provided for the purpose of orienting or determining the angular position of an adapter 140 through which there extends centrally a threaded stud 142 which is received in the adapter 140 by means of a forced fit. The adapter 140 also carries an eccentric locating pin 144 designed for cooperation with an aperture 146 formed in the master gear 58, the shape of which latter gear corresponds exactly to the shape of the finished articles or gears. The master gear 58 is provided with a central opening 150 through which the shank portion of the stud 142 is adapted to extend. A clamping nut 152 is adapted to be received on the threaded end of the stud 142 to clamp the master gear 58 firmly in position in the follower assembly 60.

The upper circular flange 112 which is formed on the upper section of the two-piece shaft 108 is identical with the flange 118 and is similarly equipped with locating pins, etc. This flange 112 is also adapted to receive thereon an adapter 154 identical with the adapter 140 and similarly shaped and equipped with a locating pin. In view of the similarity of these two adapter assemblies, similar characters of reference have been applied to the corresponding parts thereof. The locating pin 144 of the upper adapter 154 is provided for the purpose of locating one or more gear blanks 156 which are to be formed into gears by the cutting tool 26. Where finished gears are relatively thin, two or more of these gear blanks may be received on the adapter 154 in super-imposed relationship and, for convenience of illustration, three such gear blanks have been illustrated. If the finished gears are of sufficient thickness to warrant it, a single gear blank may be installed on the adapter 154. Irrespective, however, of these details in the cutting process, the essential features of the invention are not altered. The clamping nut 152 associated with the upper adapter assembly cooperates with a clamping plate 153 in maintaining the gear blanks in position on the adapter 154.

It is obvious that the relative positioning of the various locating pins 136 in the structure just described is such that the master blank or blanks 156 and master gear 58 all occupy positions of vertical alignment and the same exact degree of orientation relative to the cutting tool 26 and master rack 50 respectively.

A conventional oil pan 158 is provided for the purpose of collecting oil residue and conveying the same to the oil sump for redistribution, and it has been found convenient to utilize this oil pan 158 for the purpose of supporting a pointer 160 which cooperates with a pair of indicating marks 163 and 165 representing starting and finishing operations respectively and which are scratched or otherwise formed on the surface of the adapter 154 as an aid in determining the initial starting position of the follower assembly 60 at the commencement and finish of each gear cutting operation.

Figure 2:
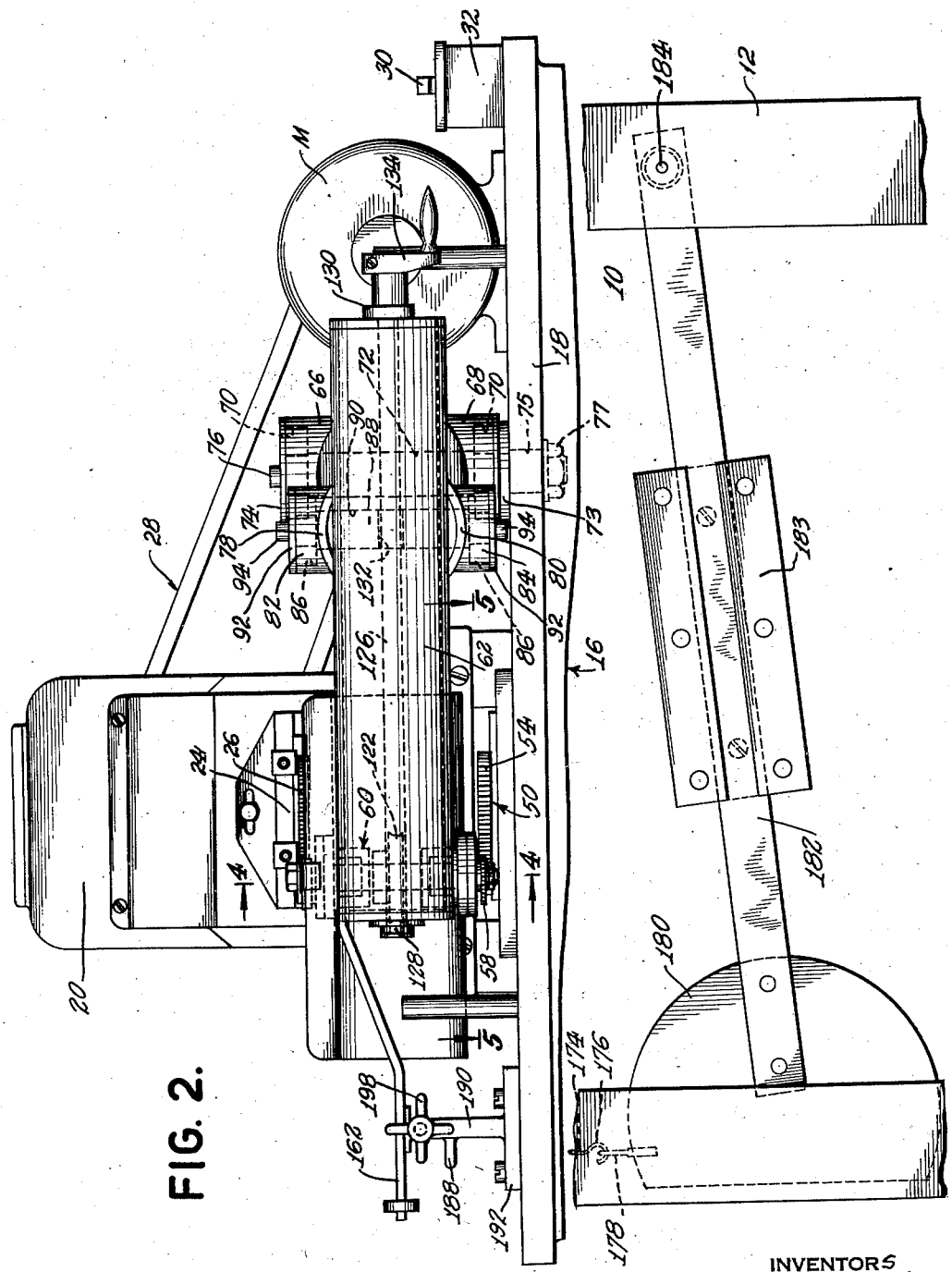
Fig. 2 is a front elevational view thereof.

An elongated arm or bias rod 162 (Figs. 1 and 2) projects outwardly and longitudinally away from the free end of the operating arm 62 and the outer end of this arm is provided with a notch 164 therein. The notch 164 is designed for reception therein of a knife edge 167 provided on a handle 166, which is attached to the end of a cable 168 and which passes over a pulley 170 carried in a bracket 172 supported on the bed plate 18. The cable 168 finally extends downwardly as at 174 and is provided with a hook 176 at its lower end which is received in an eyelet 178 mounted on a weight 180 carried at the free end of an arm 182 which is pivoted as at 184 to one of the supporting legs 12. A sliding auxiliary weight 183 is carried on the arm 182 for the purpose of varying the total effective weight applied to the cable 168. It will be seen, therefore, that the purpose of the weight 180 is to apply tension to the cable 168 to yieldingly draw the outer end of the pivoted operating arm 62 inwardly toward the shaping head 20 during gear cutting operations. The handle 166 is provided with a finger ring 186 by means of which it may be removed from the notch 164 and placed on a keeper pin 188 associated with a standard 190 formed on an adjustment block 192. The standard 190 is formed with a notch 194 in its upper regions designed for cooperation with a pointed end of a threaded screw 196 having an operating handle 198 mounted thereon. The purpose of the notch 194 and screw 196 is to locate the follower assembly 60 at the commencement of machining operations in order that the first tooth on the master gear 58 may fall into register with the first tooth on the master rack 50.

In the operation of the apparatus, a master gear which corresponds in detail to the configuration of the gear blank or blanks which are to be formed in each machining operation is installed on the adapter 140 in the manner previously described and the handle 166 is removed from the keeper pin 188 and inserted over the end of the bias rod 162 in register with the notch 164 therein, while at the same time the pointed end of the screw 196 is placed in register with the notch 194 on the adjustment block standard 190. The handle 134 at the end of the operating arm 62 is rotated until the starting line or indicia mark 163 registers with the pointer 160, at which time the first tooth on the master gear will be in register with the first tooth of the master rack 50. The adjusting screw 196 is then backed away until the master gear and master rack move into full engagement. The motor switch 30 having previously been closed and the cutting tool 26 being in operation, subsequent rotation of the handle 134 will cause rotation of the follower assembly 60 by virtue of the driving connection existing between the worm shaft 126 and worm wheel 122. Its direction of rotation will be such that due to the traction existing between the master gear and master rack, which is maintained by virtue of the weighted cable 168, the entire operating arm assembly 62, together with the follower assembly 60 carried thereby, will be moved to the right, as viewed in Fig. 1, and successive increments along the peripheral region of the gear blank or blanks 156 will be presented to the cutting action of the cutting tool 26. The cutting operation will terminate after the last tooth on the work gear has moved out of engagement with the last effective tooth on the cutting rack. Ordinarily the master gear is provided with one or two more teeth than the work gear so that when the work gear has been completed the master gear will still be meshed with the master rack. At such a time, the last tooth or teeth on the gear blank or blanks, as the case may be, will have been machined and at the same time the finished mark 165 will move into register with the indicating pointer 160. The current supply to the motor M may then be discontinued and the finished gear removed from the upper adapter 154, but it has been found that since the operating handle 134 must be manipulated to bring the various parts to their starting position to commence the next cycle of machine operation, it is well that the handle be so manipulated and the parts restored before removal of the machined gear blanks. In this manner, the rolling action between the master gear and the master rack takes place in the opposite direction and the blanks will again be subjected to the cutting action of the cutting tool 26. This restoring operation with the machine still operating has been found to give a finished surface to the gear teeth undergoing cutting.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a machine for shaping non-circular gears, the combination with a reciprocatory ram having a cutting tool of the rack type mounted thereon and movable therewith through a cutting stroke, a stationary rack positioned in a common vertical plane with said cutting tool when the latter performs its cutting stroke and substantially coextensive therewith, of a stationary bed plate disposed in a plane below said rack, a carriage mounted on said bed plate for shifting movement in all directions in a plane parallel to the plane of the bed plate, a follower assembly mounted on said carriage and including a work spindle mounted for rotation about a vertical axis and movable bodily with the carriage, a master gear carried by said spindle and designed for tractional meshing engagement with said rack, means normally and yieldingly urging said carriage in a direction to cause the master gear to engage said rack, a work holder mounted on and rotatable with said spindle and adapted to receive thereon one or more blanks, said blanks at all times occupying the same position relative to the cutting tool that the master gear occupies relative to the rack, a worm gear mounted on said spindle, a worm shaft rotatably mounted in the carriage and in meshing engagement with said spindle, and an operating handle on said worm shaft.

2. In a machine for shaping non-circular gears, the combination with a reciprocatory ram having a cutting tool of the rack type mounted thereon and movable therewith through a cutting stroke, a stationary rack positioned in a common vertical plane with said tool when the latter performs its cutting stroke and substantially coextensive therewith, of a stationary bed plate disposed in a plane below said rack, a carriage mounted on said bed plate for shifting movement thereon, a follower assembly mounted on said bed plate including a work spindle mounted for rotation about a vertical axis, an adapter carried by said work spindle and adapted to removably receive thereon a master gear, said master gear being designed for tractional meshing engagement with said rack, means normally and yieldingly urging said carriage in a direction to cause said master gear to engage said rack, a second adapter carried by said spindle and adapted to removably receive therein one or more blanks to be machined, a worm wheel mounted on said work spindle, a worm shaft rotatably mounted in the carriage and in meshing engagement with said worm wheel, and an operating handle disposed on said worm shaft.

3. In a machine for shaping non-circular gears, the combination with a reciprocatory ram having a cutting tool of the rack type mounted thereon and movable therewith through a cutting stroke, a stationary rack positioned in a common vertical plane with said tool when the latter performs its cutting stroke and substantially coextensive therewith, of a stationary bed plate disposed in a plane below said rack, a carriage mounted on said bed plate for shifting movement thereon, a follower assembly mounted on said bed plate including a work spindle mounted for rotation about a vertical axis, an adapter carried by said work spindle and adapted to removably receive thereon a master gear, said master gear being designed for tractional meshing engagement with said rack, means normally and yieldingly urging said carriage in a direction to cause said master gear to engage said rack, a second adapter carried by said spindle and adapted to removably receive therein one or more blanks to be machined, a worm wheel mounted on said spindle, a worm shaft rotatably mounted in the carriage and in meshing engagement with said worm wheel, an operating handle disposed on said worm shaft, an indicating pointer mounted on the carriage, and an indicia mark on one of said adapters designed for cooperation with said indicating pointer to indicate by its position relative to the pointer the angular position of the follower assembly relative to said rack and cutting tool.

4. In a machine for shaping non-circular gears, the combination with a reciprocatory cam having a cutting tool of the rack type mounted thereon and movable therewith through a cutting stroke, a stationary rack positioned in a common vertical plane with said cutting tool when the latter performs its cutting stroke and substantially coextensive therewith, of a stationary bed plate disposed in a plane below said rack, a carriage mounted on said bed plate for free shifting movement in all directions in a plane parallel to the plane of the bed plate, a follower assembly mounted on said carriage and including a work spindle mounted for rotation about a vertical axis and movable bodily with the carriage, a master gear carried by said spindle and designed for tractional meshing engagement with said rack, a cable having an end thereof attached to said carriage, a stationary pulley over which said cable passes, a weight freely suspended from the other end of said pulley, said pulley being so positioned that said weight by the action of gravity normally and yieldingly urges said carriage in a direction to cause the master gear to engage said rack, a work holder carried by said spindle and adapted to receive a blank, said blank at all times occupying the same position relative to the cutting tool that the master gear occupies relative to the rack, and means for manually rotating said spindle to cause the master gear thereon to traverse the rack whereby said blank will traverse said cutter.

CLARENCE C. RUTBELL.
JULIUS LUSHT.

REFERENCES CITED

The following references are of record in the file of this patent:

UNITED STATES PATENTS

| Number | Name | Date |
| --- | --- | --- |
| 1,438,530 | Jones | Dec. 12, 1922 |
| 2,324,242 | Seeck | July 13, 1943 |